US011255232B2

United States Patent
Miyake (10) Patent No.: US 11,255,232 B2
(45) Date of Patent: Feb. 22, 2022

(54) CONNECTING ROD (71) Applicant: TOYOTA JIDOSHA KABUSHIKI KAISHA, Toyota (JP)

(72) Inventor: Toshiaki Miyake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 366 days.

(21) Appl. No.: 16/256,379

(22) Filed: Jan. 24, 2019

(65) Prior Publication Data
US 2019/0249576 A1 Aug. 15, 2019

(30) Foreign Application Priority Data

Feb. 15, 2018 (JP) .............................. JP2018-025122

(51) Int. Cl.
*F01M 1/06* (2006.01)
*F16C 33/10* (2006.01)
(Continued)

(52) U.S. Cl.
CPC ................ *F01M 1/06* (2013.01); *F01M 1/02* (2013.01); *F01M 5/002* (2013.01); *F16C 9/04* (2013.01);
(Continued)

(58) Field of Classification Search
CPC .... F02B 2275/16; F16C 33/1065; F16C 3/14; F16C 2240/44; F01M 1/08;
(Continued)

(56) References Cited

U.S. PATENT DOCUMENTS 2,005,028 A * 6/1935 Eynon ...................... F16C 9/04
74/587
3,739,657 A * 6/1973 Patchen ................ F16C 7/023
74/587
(Continued)

FOREIGN PATENT DOCUMENTS

DE 3511835 A1 * 10/1986 ................ F02F 3/22
JP 58-67115 U 5/1983
(Continued)

OTHER PUBLICATIONS

JP 2016121702 A—English Translation (Year: 2016).*

*Primary Examiner* — George C Jin
*Assistant Examiner* — Teuta B Holbrook
(74) *Attorney, Agent, or Firm* — Oblon, McClelland, Maier & Neustadt, L.L.P.

(57) ABSTRACT

A small end of a connecting rod includes an oil supply hole extending from an outer surface to an inner surface of the small end. The oil supply hole includes an oil storage groove and a communication hole. The oil storage groove is recessed from the outer surface and extends along the circumference of the small end. The communication hole extends through a bottom surface of the oil storage groove and connects the outer and inner surfaces. Opposite edges of the oil storage groove contact the outer surface in a direction the oil storage groove extends. The bottom surface of the oil storage groove has an opening contacting a wall surface of the communication hole. When the small end includes a distal end of the connecting rod defining a top, the opposite edges are located between the top and the opening in the bottom surface of the oil storage groove.

5 Claims, 5 Drawing Sheets (51) Int. Cl.
    *F16C 9/04* (2006.01)
    *F01M 5/00* (2006.01)
    *F01M 1/02* (2006.01)
    *F16C 7/02* (2006.01)

(52) U.S. Cl.
    CPC ........ *F16C 33/103* (2013.01); *F16C 33/1065* (2013.01); *F01M 2001/066* (2013.01); *F16C 7/023* (2013.01); *F16C 2360/22* (2013.01)

(58) Field of Classification Search
    CPC .............. F01M 2001/086; F01M 1/06; F01M 2001/066; F01M 2011/025
    USPC ...................................... 123/197.3
    See application file for complete search history.

(56) References Cited

U.S. PATENT DOCUMENTS

| | | | | |
|---|---|---|---|---|
| 6,745,742 B2 * | 6/2004 | Meyer | ...................... | F01M 1/06 |
| | | | | 123/197.3 |
| 7,533,638 B1 * | 5/2009 | Berger | ................ | F02B 75/045 |
| | | | | 123/48 B |
| 7,975,806 B2 * | 7/2011 | Glass | ................ | F16C 33/1065 |
| | | | | 184/6.5 |

FOREIGN PATENT DOCUMENTS

| | | | | |
|---|---|---|---|---|
| JP | 58-137808 U | | 9/1983 | |
| JP | 2000240421 A | * | 9/2000 | |
| JP | 2008-215373 A | | 9/2008 | |
| JP | 2016121702 A | * | 7/2016 | ................ F16J 7/00 |
| WO | WO 2016/104171 A1 | | 6/2016 | |

\* cited by examiner

CONNECTING ROD

BACKGROUND

The present invention relates to a connecting rod of an internal combustion engine.

Japanese Unexamined Utility Model Publication No. 58-67115 describes a typical connecting rod having a small end including an oil supply hole. The publication discloses an oil jet installed on a cylinder block. When the oil jet squirts oil toward the rear surface of a piston, the oil flows into the oil supply hole in the small end of the connecting rod. The oil is supplied from the oil supply hole to a pinhole, through which a piston pin is inserted, to lubricate surfaces of the connection rod and the piston pin that slide against each other.

An oil jet installed on a cylinder block such as that described in the above publication squirts a portion of oil that is drawn up from an oil pan by an oil pump. Such an oil jet may be configured not to squirt the oil at a low hydraulic pressure. Thus, the oil jet may not supply oil in a period in which the hydraulic pressure has not been increased, such as for a predetermined amount of time from a start of the internal combustion engine. This may result in an insufficient amount of oil for lubricating the sliding surfaces of the connecting rod and the piston pin.

SUMMARY

A connecting rod includes a big end connected to a crankshaft of an internal combustion engine, a small end in which a pinhole is open to accommodate a piston pin inserted through the pinhole, and a shank coupling the big end and the small end. The small end has an outer circumferential surface and an inner circumferential surface and includes an oil supply hole extending from the outer circumferential surface to the inner circumferential surface. The oil supply hole includes an oil storage groove and a communication hole. The oil storage groove is recessed from the outer circumferential surface of the small end toward the inner circumferential surface of the small end and extends in a circumferential direction of the small end. The communication hole extends through a bottom surface of the oil storage groove and connects the outer circumferential surface of the small end and the inner circumferential surface of the small end. The oil storage groove includes opposite edges that are in contact with the outer circumferential surface of the small end in a direction in which the oil storage groove extends. The bottom surface of the oil storage groove has an opening that is in contact with a wall surface of the communication hole. When the small end includes a distal end of the connecting rod defining a top portion and the small end includes a portion proximate to the shank defining a bottom portion, the opposite edges of the oil storage groove are located between the top portion and the opening in the bottom surface of the oil storage groove.

The connecting rod includes the oil storage groove recessed from the outer circumferential surface toward the inner circumferential surface of the small end in addition to the communication hole that connects the outer circumferential surface and the inner circumferential surface of the small end. The communication hole and the oil storage groove define the oil supply hole.

If the opposite edges of the oil storage groove are located between the opening and the bottom portion, when oil is supplied to the oil supply hole, the oil is readily discharged from the edges without remaining in the oil storage groove. In this regard, in the above configuration, the edges of the oil storage groove are located between the opening and the top portion so that the oil storage groove stores oil supplied to the oil supply hole. Thus, for example, when the internal combustion engine is stopped, oil is held in the oil storage groove and the communication hole. When the internal combustion engine starts, the oil is supplied from the oil storage groove and the communication hole to the pinhole. More specifically, even when the supply of oil from an oil jet is stopped, the oil lubricating the sliding surfaces of the connecting rod and the piston pin is ensured by holding oil in the oil storage groove in addition to the communication hole until the supply of oil starts.

In an example of the connecting rod described above, the communication hole includes an open end that is open in the outer circumferential surface of the small end. The open end is tapered so that the open end has a diameter that increases toward the outer circumferential end. The open end is located between the opposite edges of the oil storage groove in the circumferential direction of the small end.

In the above configuration, the oil storage groove extends in a range wider than the tapered open end in the circumferential direction of the small end. This increases the capacity of storing oil.

In an example of the connecting rod described above, the oil storage groove is narrower than the communication hole in a direction along a center axis of the pinhole.

When the small end includes an oil supply hole that extends from the outer circumferential surface to the inner circumferential surface of the small end, the rigidity of the small end may be lowered as the oil supply hole enlarges.

In the above configuration, the capacity of storing oil is increased by the oil storage groove that is narrower than the communication hole. Thus, an increase in the capacity of storing oil subtly lowers the rigidity.

In an example of the connecting rod described above, the small end has a thickness that decreases from the bottom portion toward the top portion in the direction along the center axis of the pinhole.

Even when the thickness of the top portion of the small end is decreased as in the above configuration, the lowering of the rigidity of the small end that occurs when the small end includes an oil storage groove may be limited as long as the oil storage groove is narrow.

In an example of the connecting rod described above, when a distance from the outer circumferential surface of the small end to the bottom surface of the oil storage groove in a radial direction of the small end defines a depth of the oil storage groove, the bottom surface of the oil storage groove is arcuate so that the depth of the oil storage groove increases from the opposite edges of the oil storage groove toward the opening.

When the bottom surface is arcuate as in the above configuration, the oil storage groove is readily formed so that the opposite edges of the oil storage groove are located closer to the top portion than the opening.

BRIEF DESCRIPTION OF THE DRAWINGS

The embodiments, together with objects and advantages thereof, may best be understood by reference to the following description of the presently preferred embodiments together with the accompanying drawings in which.

DETAILED DESCRIPTION OF THE PREFERRED EMBODIMENTS

An embodiment of a connecting rod will now be described with reference to FIGS. 1 to 7.

Figure 1:
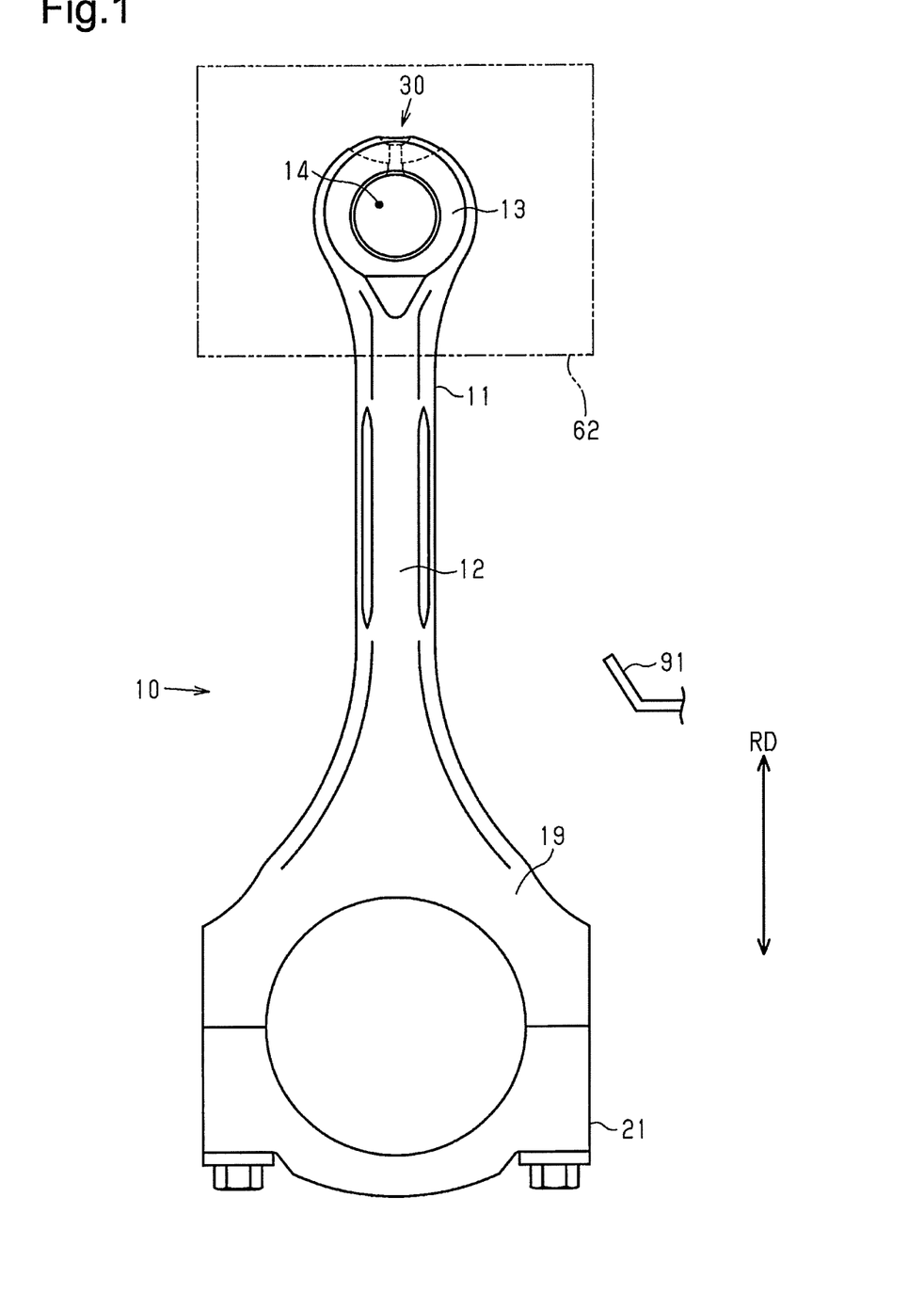
FIG. 1 is a schematic diagram showing an embodiment of a connecting rod.

FIG. 1 shows a connecting rod 10 connecting a piston 62 and a crankshaft of an internal combustion engine. The connecting rod 10 includes a small end 13 connected the piston 62. The connecting rod 10 includes a big end 19 connected to the crankshaft. The connecting rod 10 includes a shank 12 joining the small end 13 and the big end 19.

The connecting rod 10 includes a rod body 11 and a cap 21. The rod body 11 includes the small end 13 and the shank 12. The big end 19 includes the rod body 11 and the cap 21 coupled to the rod body 11.

A pinhole 14 is open in the small end 13 to accommodate a piston pin inserted through the pinhole 14. The small end 13 includes an oil supply hole 30 through which oil is supplied to the pinhole 14. The cylinder block includes an oil jet 91 that squirts oil toward the rear surface of the piston 62. The oil is partially drawn into the oil supply hole 30.

In FIG. 1, the direction in which the shank 12 extends is indicated as the rod extension direction RD. The rod extension direction RD extends parallel to a straight line that connects the center of the pinhole 14 of the small end 13 and the center of a hole in the big end 19.

Figure 2:
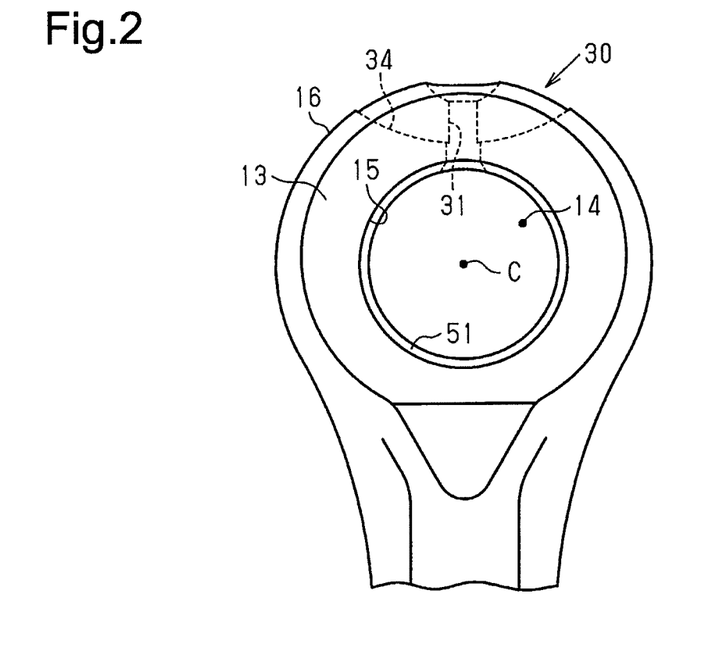
FIG. 2 is a front view showing a small end of the connecting rod of the embodiment.
Figure 3:
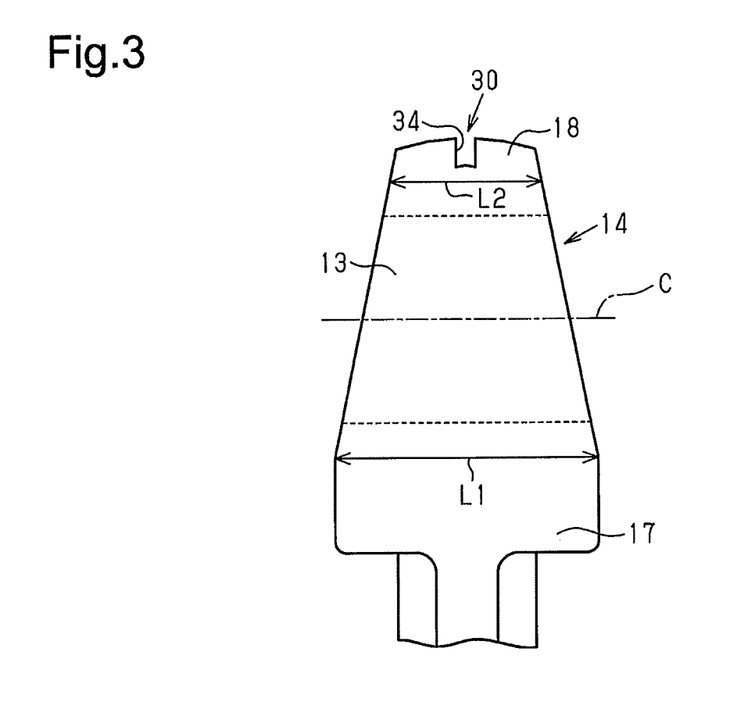
FIG. 3 is a side view showing the small end of the connecting rod of the embodiment.
Figure 4:
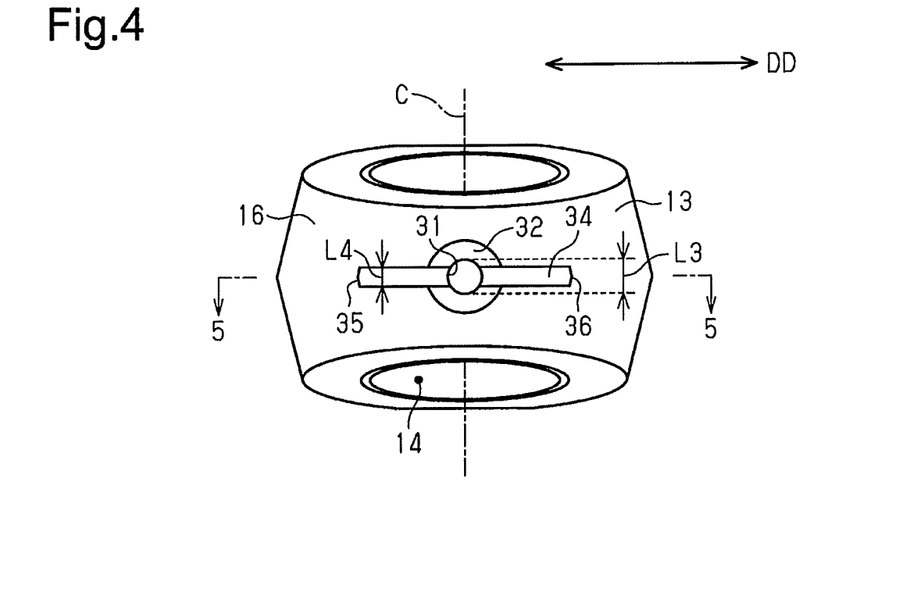
FIG. 4 is a plan view showing the small end of the connecting rod of the embodiment.
Figure 5:
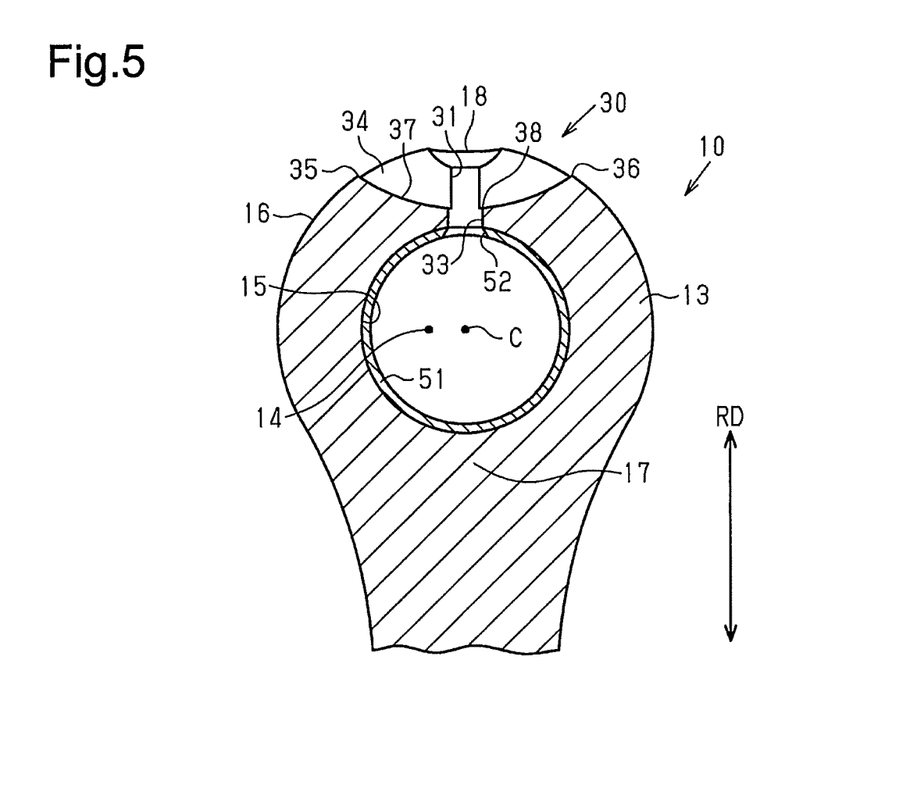
FIG. 5 is a cross-sectional view taken along line 5-5 in FIG. 4.

The small end 13 of the connecting rod 10 will now be described with reference to FIGS. 2 to 5. In FIGS. 2 to 4, the center axis of the pinhole 14 of the small end 13 is indicated as the center axis C. FIG. 3 is a side view of the small end 13 taken from the left side in FIG. 2. FIG. 4 is a plan view of the small end 13 taken from the upper side in FIG. 2. FIG. 5 is a cross-sectional view taken along line 5-5 in FIG. 4.

As shown in FIG. 2, a tubular bushing 51 is configured to fit to the pinhole 14 and is inserted into the pinhole 14 of the small end 13.

The small end 13 includes the distal end of the connecting rod 10 defining a top portion 18. A portion of the small end 13 proximate to the shank 12 defines a bottom portion 17. FIG. 3 shows the thickness of the small end 13 in the axial direction of the center axis C. As shown in FIG. 3, in a direction along the center axis C of the pinhole 14, the bottom portion 17 has a thickness L1, and the top portion 18 has a thickness L2 that is less than the thickness L1. The thickness of the small end 13 decreases from the bottom portion 17 toward the top portion 18.

As shown in FIGS. 2 to 4, the oil supply hole 30 in the small end 13 includes a communication hole 31 that extends from an outer circumferential surface 16 of the small end 13 to an inner circumferential surface 15 of the small end 13. The oil supply hole 30 includes an oil storage groove 34 that is recessed from the outer circumferential surface 16 of the small end 13 toward the inner circumferential surface 15 of the small end 13.

As shown in FIGS. 2 and 4, the communication hole 31 includes an open end 32 that is open in the outer circumferential surface 16. The open end 32 is tapered so that the diameter increases toward the outer circumferential surface 16.

As shown in FIG. 4, the oil storage groove 34 extends in a circumferential direction of the small end 13. In FIG. 4, the direction in which the oil storage groove 34 extends is indicated as the groove direction DD. In the groove direction DD, the oil storage groove 34 has two opposite edges, namely, a first edge 35 and a second edge 36, and the open end 32 of the communication hole 31 is located between the first edge 35 and the second edge 36. The first edge 35 and the second edge 36 are in contact with the outer circumferential surface 16 of the small end 13.

As shown in FIG. 4, in the axial direction of the center axis C, the communication hole 31 has a diameter L3, and the oil storage groove 34 has a width L4 that is less than the diameter L3. More specifically, in a direction along the center axis C of the pinhole 14, the oil storage groove 34 is narrower than the communication hole 31.

As shown in FIG. 5, the communication hole 31 extends from the outer circumferential surface 16 to the inner circumferential surface 15 through a bottom surface 37 of the oil storage groove 34. The communication hole 31 is arranged so that the communication hole 31 extends in a direction parallel to the rod extension direction RD.

An oil hole 52 is open in the bushing 51 and connected to the communication hole 31.

The wall surface of the communication hole 31 is referred to as a hole wall surface 33. The part where the hole wall surface 33 is in contact with the bottom surface 37 of the oil storage groove 34 is referred to as an opening 38. The first edge 35 and the second edge 36 of the oil storage groove 34 are located between the opening 38 and the top portion 18.

In the radial direction of the small end 13, the distance from the outer circumferential surface 16 of the small end 13 to the bottom surface 37 of the oil storage groove 34 defines the depth of the oil storage groove 34. The depth of the oil storage groove 34 increases from the first edge 35 toward the opening 38. In the same manner, the depth of the oil storage groove 34 increases from the second edge 36 toward the opening 38. With such a configuration, the bottom surface 37 of the oil storage groove 34 is arcuate in the cross section shown in FIG. 5.

The operation and advantages of the present embodiment will now be described.

In an internal combustion engine including the connecting rod 10, as shown in FIG. 1, the oil jet 91 is installed on the cylinder block to squirt oil toward the rear surface of the piston 62. A portion of the oil squirted from the oil jet 91 or a portion of oil splashed back from the rear surface of the piston 62 are drawn into the oil supply hole 30. The oil flows through the oil supply hole 30 and is supplied to the pinhole 14. This lubricates the sliding surfaces of the small end 13 of the connecting rod 10 and the piston pin, that is, the inner circumferential surface of the bushing 51 and the outer circumferential surface of the piston pin that slide against each other.

Figure 6:
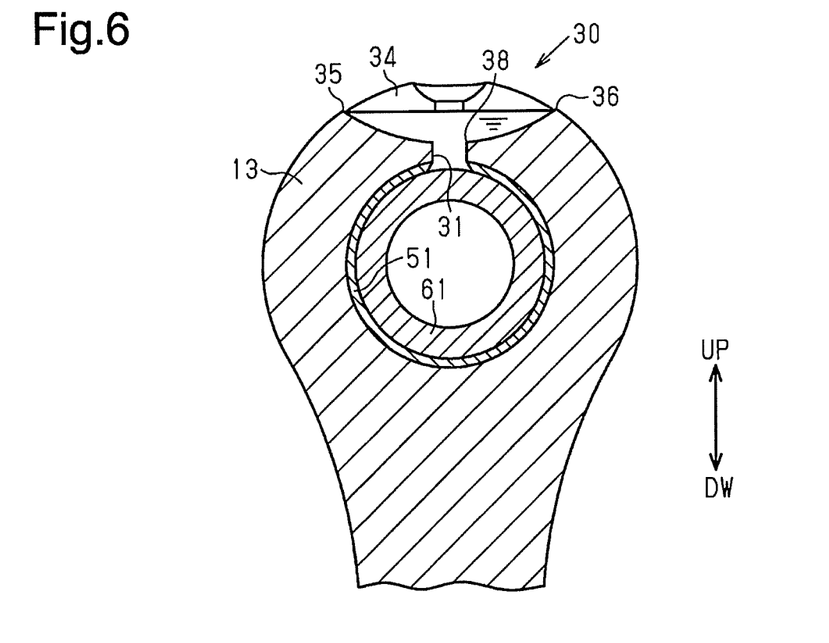
FIG. 6 is a cross-sectional view showing the connecting rod of the embodiment.
Figure 7:
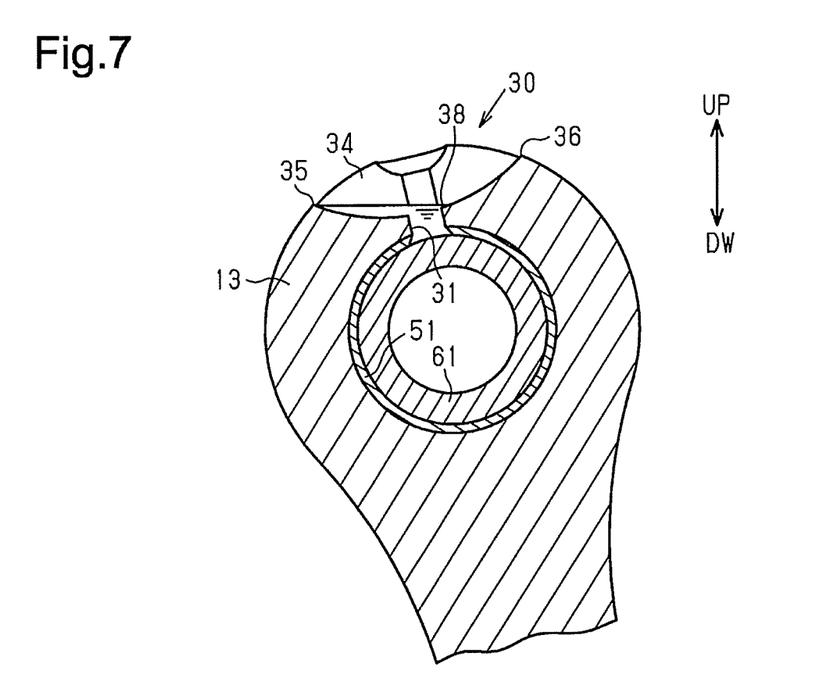
FIG. 7 is a cross-sectional view showing the connecting rod of the embodiment.

FIGS. 6 and 7 are cross-sectional views of the small end 13 of the connecting rod 10 included in the internal combustion engine. A tubular piston pin 61 is inserted into the pinhole 14 to couple the small end 13 and the piston 62. FIGS. 6 and 7 indicate a vertically upper side UP and a vertically lower side DW.

In the connecting rod 10, the first edge 35 and the second edge 36 of the oil storage groove 34 are located between the opening 38 and the top portion 18. Thus, as shown in FIG. 6, when the connecting rod 10 is arranged so that the rod extension direction RD extends parallel to the direction extending from the vertically upper side UP toward the vertically lower side DW, the oil supplied to the oil supply hole 30 is stored in the oil storage groove 34. This allows the oil storage groove 34 and the communication hole 31 to hold the oil, for example, when the internal combustion engine is stopped. Then, when the internal combustion engine starts, the oil is supplied to the pinhole 14 from the oil storage groove 34 and the communication hole 31. More specifically, in addition to the communication hole 31, the oil storage groove 34 holds the oil. Thus, even when the supply of oil from the oil jet 91 is stopped, the oil that lubricates the sliding surfaces of the connecting rod 10 and the piston pin 61 is ensured until the supply of oil starts.

FIG. 7 shows the connecting rod 10 that is inclined in accordance with rotation of the crankshaft. In the connecting rod 10, the communication hole 31 extends in the rod extension direction RD. If the communication hole 31 is arranged so that the open end 32 is open in a position shifted from the position shown in FIG. 7 to either side in the circumferential direction of the small end 13, it may be difficult for the oil storage groove 34 to hold the oil depending on the inclination angle of the connecting rod 10. In this regard, with the connecting rod 10, as shown in FIG. 7, even when the internal combustion engine is stopped with the connecting rod 10 inclined, the oil storage groove 34 readily holds the oil.

Additionally, in the connecting rod 10, the oil storage groove 34 extends in a range wider than the tapered open end 32 in the circumferential direction of the small end 13. This increases the volume of the oil supply hole 30 capable of storing oil.

The connecting rod 10 is shaped so that the thickness of the small end 13 decreases from the bottom portion 17 toward the top portion 18. Thus, increases in the volume of the oil supply hole 30 may lower the rigidity of the small end 13. In this regard, in the connecting rod 10, the width L4 of the oil storage groove 34 is less than the diameter L3 of the communication hole 31. The narrow oil storage groove 34 increases the capacity of storing oil while limiting the lowering of the rigidity of the small end 13 that occurs when the small end 13 includes the oil storage groove 34.

The connecting rod 10 includes the tapered open end 32. Thus, when the oil jet 91 squirts oil, the oil squirted from the oil jet 91 and oil splashed back from the rear surface of the piston 62 are readily drawn into the oil supply hole 30. Additionally, in the connecting rod 10, the oil storage groove 34 is open in the outer circumferential surface 16. Thus, the oil is further readily drawn into the oil supply hole 30. More specifically, the oil is readily supplied to the pinhole 14 and lubricates the sliding surfaces.

In the connecting rod 10, the bottom surface 37 is arcuate in the cross section shown in FIG. 5. When manufacturing the connecting rod 10, for example, a grinding tool is used to form the oil storage groove 34 in the small end 13. In this case, the machining process readily forms the oil storage groove 34 in which the first edge 35 and the second edge 36 of the oil storage groove 34 are located between the opening 38 and the top portion 18.

The present embodiment may be modified as follows. The embodiment and the modified examples may be combined within a range in which no technical contradiction occurs.

In the embodiment, the connecting rod 10 includes the oil storage groove 34 having the arcuate bottom surface 37. The shape of the oil storage groove is not limited to such a configuration.

Figure 8:
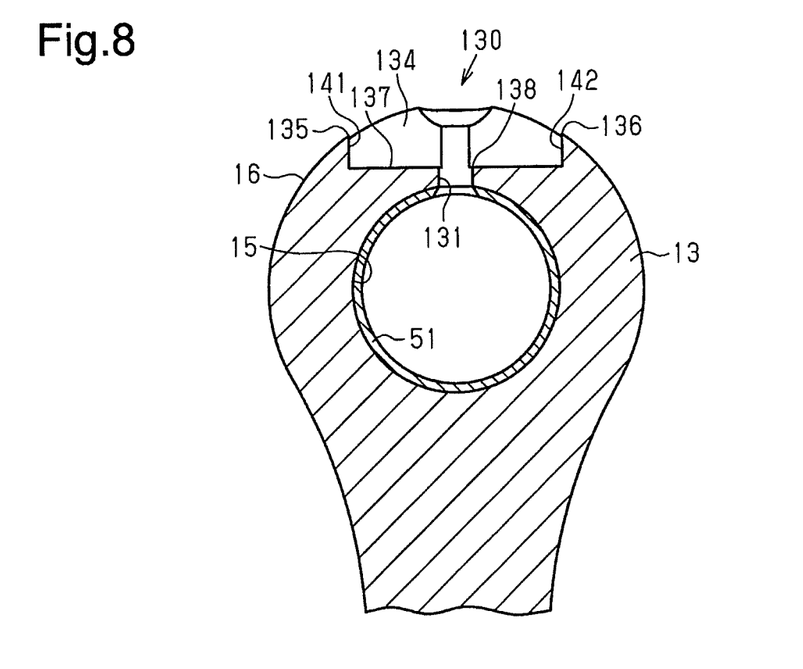
FIG. 8 is a cross-sectional view showing a modified example of a connecting rod.

For example, as shown in FIG. 8, the small end 13 may include an oil storage groove 134 defined by a bottom surface 137, a first side surface 141, and a second side surface 142. The bottom surface 137 extends in a direction orthogonal to the rod extension direction RD. The first side surface 141 and the second side surface 142 extend from the bottom surface 137 in the rod extension direction RD. The oil storage groove 134 has a first edge 135 and a second edge 136 that are located between an opening 138 and the top portion of the small end 13. Thus, an oil supply hole 130 defined by the oil storage groove 134 and an communication hole 131 holds oil. More specifically, in the same manner as the above-described embodiment, even when the supply of oil from the oil jet 91 is stopped, the oil that lubricates the sliding surfaces is ensured until the supply of oil starts.

Figure 9:
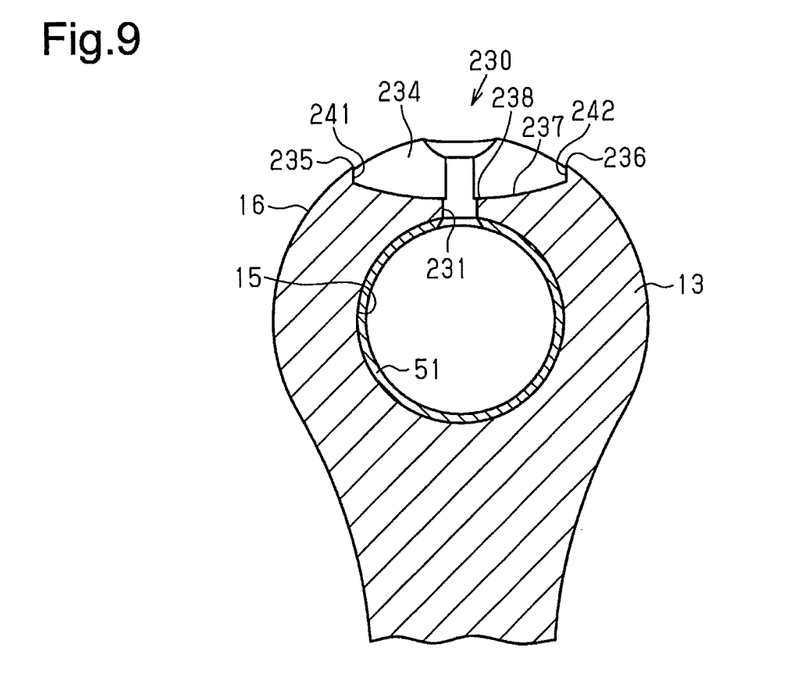
FIG. 9 is a cross-sectional view showing another modified example of a connecting rod.

In the oil storage groove 134 defined by the bottom surface 137, the first side surface 141, and the second side surface 142 as shown in FIG. 8, an oil storage groove may include an arcuate bottom surface. More specifically, as shown in FIG. 9, an oil storage groove 234 may be defined by an arcuate bottom surface 237, a first side surface 241, and a second side surface 242. With an oil supply hole 230 defined by the oil storage groove 234 and a communication hole 231, as long as a first edge 235 and a second edge 236 are located between an opening 238 and the top portion of the small end 13, the oil supply hole 230 holds oil. More specifically, in the same manner as the above-described embodiment, even when the supply of oil from the oil jet 91 is stopped, the oil that lubricates the sliding surfaces is ensured until the supply of oil starts.

In the above-described embodiment, the open end 32 of the communication hole 31 is tapered. However, the open end 32 does not necessarily have to be tapered. For example, the wall surface of the open end 32 may extend in a direction parallel to the rod extension direction RD.

In the above-described embodiment, the small end 13, the thickness of which decreases from the bottom portion 17 toward the top portion 18 in the axial direction of the center axis C, includes the oil supply hole 30. Instead, a connecting rod may include a small end having a constant thickness in the axial direction of the center axis C, and the small end may include the oil supply hole 30 including the communication hole 31 and the oil storage groove 34.

In the above-described embodiment, the width L4 of the oil storage groove 34 is less than the diameter L3 of the communication hole 31 in the axial direction of the center axis C. The width L4 of the oil storage groove 34 may be greater than or equal to the diameter L3 of the communication hole 31.

In the above-described embodiment, the extension direction of the communication hole 31 conforms to the rod extension direction RD. However, the extension direction of the communication hole 31 may be changed. The effect of the oil storage groove 34 holding oil is produced by changing the position of the oil storage groove 34 so that the first edge 35 and the second edge 36 are located between the opening 38 and the top portion 18.

The communication hole 31 may be shaped to have an elliptical contour in a plan view of the small end 13 such as that shown in FIG. 4.

The depth of the oil storage groove 34 may be changed in a range that satisfies the positional relationship of the first edge 35 and the second edge 36 being located between the opening 38 and the top portion 18. Additionally, the shape of the bottom surface 37 of the oil storage groove 34 may be changed in a range that satisfies the positional relationship of the first edge 35 and the second edge 36 with the opening 38. For example, the bottom surface 37 of the oil storage groove 34 may be stepped.

What is claimed is:

1. A connecting rod, comprising:
a big end connected to a crankshaft of an internal combustion engine;
a small end in which a pinhole is open to accommodate a piston pin inserted through the pinhole; and
a shank coupling the big end and the small end, wherein
the small end has an outer circumferential surface and an inner circumferential surface and includes an oil supply hole extending from the outer circumferential surface to the inner circumferential surface,
the oil supply hole includes a hollow storage groove and a communication hole,
the oil storage groove is recessed from the outer circumferential surface of the small end toward the inner circumferential surface of the small end and extends in a circumferential direction of the small end,
the communication hole extends through a bottom surface of the oil storage groove and connects the outer circumferential surface of the small end and the inner circumferential surface of the small end,
the oil storage groove includes opposite edges that are in contact with the outer circumferential surface of the small end in a direction in which the oil storage groove extends, the bottom surface of the oil storage groove has an opening that is in contact with a wall surface of the communication hole, and
when the small end includes a distal end of the connecting rod defining a top portion and the small end includes a portion proximate to the shank defining a bottom portion, the opposite edges of the oil storage groove are located between the top portion and the opening in the bottom surface of the oil storage groove.

2. The connecting rod according to claim 1, wherein
the communication hole includes an open end that is open in the outer circumferential surface of the small end,
the open end is tapered so that the open end has a diameter that increases toward the outer circumferential end,
the open end is located between the opposite edges of the oil storage groove in the circumferential direction of the small end.

3. The connecting rod according to claim 1, wherein the oil storage groove is narrower than the communication hole in a direction along a center axis of the pinhole.

4. The connecting rod according to claim 3, wherein the small end has a thickness that decreases from the bottom portion toward the top portion in the direction along the center axis of the pinhole.

5. The connecting rod according to claim 1, wherein when a distance from the outer circumferential surface of the small end to the bottom surface of the oil storage groove in a radial direction of the small end defines a depth of the oil storage groove, the bottom surface of the oil storage groove is arcuate so that the depth of the oil storage groove increases from the opposite edges of the oil storage groove toward the opening.

* * * * *